(12) United States Patent
Greetham (10) Patent No.: US 11,682,914 B2
(45) Date of Patent: Jun. 20, 2023

(54) BATTERY SYSTEM

(71) Applicant: Dyson Technology Limited, Wiltshire (GB)

(72) Inventor: Stephen Greetham, Gloucester (GB)

(73) Assignee: Dyson Technology Limited, Wiltshire (GB)

( * ) Notice: Subject to any disclaimer, the term of this patent is extended or adjusted under 35 U.S.C. 154(b) by 786 days.

(21) Appl. No.: 16/463,767

(22) PCT Filed: Nov. 23, 2017

(86) PCT No.: PCT/GB2017/053529
§ 371 (c)(1),
(2) Date: May 23, 2019

(87) PCT Pub. No.: WO2018/096341
PCT Pub. Date: May 31, 2018

(65) Prior Publication Data
US 2019/0288528 A1  Sep. 19, 2019

(30) Foreign Application Priority Data
Nov. 25, 2016 (GB) ...................................... 1619969

(51) Int. Cl.
*H01M 10/46* (2006.01)
*H02J 7/00* (2006.01)
(Continued)

(52) U.S. Cl.
CPC ............ *H02J 7/0024* (2013.01); *B60L 58/19* (2019.02); *H01M 10/0445* (2013.01);
(Continued)

(58) Field of Classification Search
CPC .......... H02J 7/0024; H02J 7/00; H01M 10/04; H01M 10/0445; H01M 2220/20;
(Continued)

(56) References Cited

U.S. PATENT DOCUMENTS 3,256,474 A  6/1966 Englund, Jr.
3,923,116 A  12/1975 Thompson et al.
(Continued)

FOREIGN PATENT DOCUMENTS

AU  2015101232 A4 * 10/2015 .......... H01M 10/425
CN  202405823      8/2012
(Continued)

OTHER PUBLICATIONS

International Search Report and Written Opinion dated Mar. 5, 2018, directed to PCT/GB2017/053529; 14 pages.
(Continued)

*Primary Examiner* — Edward Tso
(74) *Attorney, Agent, or Firm* — Faegre Drinker Biddle & Reath LLP (57) ABSTRACT

A battery system comprising positive and negative charge-discharge terminals, first and second batteries, first and second unidirectional switches, and a bridging switch. The first battery and the first unidirectional switch are connected in series across the charge-discharge terminals such that the first unidirectional switch provides a conductive path from the positive charge-discharge terminal to a positive terminal of the first battery. The second battery and the second unidirectional switch are connected in series across the charge-discharge terminals such that the second unidirectional switch provides a conductive path from the negative terminal of the second battery to the negative charge-discharge terminal. The batteries and the bridging switch are connected in series across the charge-discharge terminals, with the bridging switch being located between the positive terminal of the first battery and the negative terminal of the second battery.

9 Claims, 8 Drawing Sheets

(51) Int. Cl.
*H01M 10/04* (2006.01)
*B60L 58/19* (2019.01)
*B60L 58/18* (2019.01)

(52) U.S. Cl.
CPC ........... *B60L 58/18* (2019.02); *B60Y 2200/91* (2013.01); *H01M 2220/20* (2013.01); *Y02T 10/70* (2013.01)

(58) Field of Classification Search
CPC ...... B60L 58/18; B60L 58/19; B60Y 2200/91; Y02T 10/70
USPC .................... 320/128, 116, 117, 121, 125
See application file for complete search history.

(56) References Cited

U.S. PATENT DOCUMENTS

| | | | |
|---|---|---|---|
| 4,277,737 | A | 7/1981 | Mueller-Werth |
| 4,297,629 | A | 10/1981 | Godard et al. |
| 4,315,162 | A * | 2/1982 | Ferguson ............... G06F 1/263 307/66 |
| 5,734,205 | A | 3/1998 | Okamura et al. |
| 6,674,180 | B2 | 1/2004 | Gale et al. |
| 7,489,048 | B2 | 2/2009 | King et al. |
| 7,571,683 | B2 * | 8/2009 | Kumar ................... B60L 50/51 105/49 |
| 7,710,067 | B2 | 5/2010 | Kosaka et al. |
| 7,723,954 | B2 | 5/2010 | Fruecht |
| 7,893,561 | B2 | 2/2011 | Weidenheimer et al. |
| 8,436,580 | B2 | 5/2013 | Tai |
| 8,994,318 | B2 | 3/2015 | Kurfiss et al. |
| 9,041,251 | B2 | 5/2015 | Schill |
| 9,045,052 | B2 | 6/2015 | Girard et al. |
| 9,093,854 | B2 | 7/2015 | Kessler |
| 9,281,700 | B2 | 3/2016 | Feuerstack et al. |
| 9,343,914 | B2 | 5/2016 | Dwertmann et al. |
| 9,362,771 | B2 | 6/2016 | Weissenborn et al. |
| 9,413,046 | B2 | 8/2016 | Feuerstack et al. |
| 9,577,441 | B2 | 2/2017 | Fassnacht et al. |
| 9,634,601 | B2 | 4/2017 | Kessler et al. |
| 9,653,917 | B2 | 5/2017 | Howlett |
| 9,667,087 | B2 | 5/2017 | Kessler et al. |
| 9,676,278 | B2 | 6/2017 | Mueller |
| 9,698,720 | B2 | 7/2017 | Hawliczek et al. |
| 9,725,007 | B2 | 8/2017 | Hashimoto |
| 2008/0174274 | A1 | 7/2008 | Kosaka et al. |
| 2008/0198632 | A1 * | 8/2008 | Takayanagi ............ H02J 7/022 363/17 |
| 2008/0278117 | A1 * | 11/2008 | Tarchinski ............. B60K 6/48 320/135 |
| 2010/0231162 | A1 | 9/2010 | Gibson et al. |
| 2010/0305792 | A1 | 12/2010 | Wilk et al. |
| 2011/0095615 | A1 * | 4/2011 | Li .......................... H02J 9/061 307/80 |
| 2011/0305933 | A1 * | 12/2011 | Huang ................... H01M 50/20 429/97 |
| 2012/0299549 | A1 | 11/2012 | Kim et al. |
| 2013/0141032 | A1 * | 6/2013 | Xu ....................... H01M 10/615 320/103 |
| 2013/0241290 | A1 * | 9/2013 | Higuchi ................. H02M 1/14 333/175 |
| 2013/0285456 | A1 | 10/2013 | Feuerstack et al. |
| 2014/0077594 | A1 | 3/2014 | Bergfjord |
| 2014/0104906 | A1 | 4/2014 | Feuerstack |
| 2014/0368041 | A1 | 12/2014 | Tu et al. |
| 2015/0024240 | A1 | 1/2015 | Seubert et al. |
| 2015/0137764 | A1 | 5/2015 | Kessler |
| 2015/0263390 | A1 | 9/2015 | Gagneur et al. |
| 2015/0380776 | A1 | 12/2015 | Partes et al. |
| 2016/0001664 | A1 | 1/2016 | Roth |
| 2016/0036233 | A1 | 2/2016 | Yatsu |
| 2016/0134160 | A1 * | 5/2016 | Schultz ............... H02J 7/00306 307/77 |
| 2016/0368392 | A1 | 12/2016 | Braun et al. |
| 2017/0028856 | A1 | 2/2017 | Heusinkveld et al. |
| 2017/0217313 | A1 | 8/2017 | Hashimoto |
| 2017/0305289 | A1 | 10/2017 | Meitinger et al. |
| 2018/0109122 | A1 | 4/2018 | Koerner |

FOREIGN PATENT DOCUMENTS

| | | |
|---|---|---|
| CN | 203813493 | 9/2014 |
| CN | 105958144 | 9/2016 |
| CN | 107086645 | 8/2017 |
| DE | 2533414 | 2/1977 |
| DE | 10055531 | 1/2002 |
| DE | 102010020473 | 11/2010 |
| DE | 102009035483 | 2/2011 |
| DE | 102009047065 | 5/2011 |
| DE | 102010041036 | 3/2012 |
| DE | 102011005911 | 9/2012 |
| DE | 102012003023 | 10/2012 |
| DE | 102011109709 | 2/2013 |
| DE | 102012202853 | 8/2013 |
| DE | 102012202863 | 8/2013 |
| DE | 102012205095 | 10/2013 |
| DE | 102012209179 | 12/2013 |
| DE | 102012210010 | 12/2013 |
| DE | 102012215743 | 3/2014 |
| DE | 102013102576 | 9/2014 |
| DE | 102014009088 | 11/2014 |
| DE | 102013211302 | 12/2014 |
| DE | 102013021217 | 6/2015 |
| DE | 102014018445 | 6/2015 |
| DE | 102014101597 | 8/2015 |
| DE | 102014004790 | 10/2015 |
| DE | 102015006208 | 12/2015 |
| DE | 102014215070 | 2/2016 |
| DE | 102015200276 | 7/2016 |
| DE | 102015104293 | 9/2016 |
| DE | 102015205278 | 9/2016 |
| DE | 102016008052 | 2/2017 |
| DE | 102016008263 | 2/2017 |
| DE | 102016011894 | 4/2017 |
| DE | 102016223470 | 6/2017 |
| EP | 2897247 | 7/2015 |
| FR | 1275514 | 11/1961 |
| GB | 2089592 | 6/1982 |
| GB | 2322021 | 8/1998 |
| GB | 2506468 | 4/2014 |
| JP | S56-134477 | 10/1981 |
| JP | H4-332015 | 11/1992 |
| JP | H11-299112 | 10/1999 |
| JP | H11-299119 | 10/1999 |
| JP | 2000-175363 | 6/2000 |
| JP | 2002-142375 | 5/2002 |
| JP | 2007-274830 | 10/2007 |
| JP | 2008-67500 | 3/2008 |
| JP | 2009-71921 | 4/2009 |
| JP | 2010-57288 | 3/2010 |
| JP | 2013-106474 | 5/2013 |
| JP | 5811872 | 11/2015 |
| JP | 2016-92990 | 5/2016 |
| JP | 2016-129480 | 7/2016 |
| JP | 6183709 | 8/2017 |
| WO | 2005/006515 | 1/2005 |

OTHER PUBLICATIONS

Search Report dated Apr. 7, 2017, directed to GB Application No. 1619969.7; 1 page.

* cited by examiner

| First Switch | Second Switch | Condition |
|---|---|---|
| A closed, B open | A closed, B open | Batteries connected in parallel across charge-discharge terminals (first configuration). |
| A open, B closed | A open, B closed | Batteries connected in series across charge-discharge terminals (second configuration). |
| A closed, B open | A open, B closed | First battery connected across charge-discharge terminals. Second battery in open circuit. |
| A open, B closed | A closed, B open | Second battery connected across charge-discharge terminals. First battery in open circuit. |

BATTERY SYSTEM

REFERENCE TO RELATED APPLICATIONS

This application is a national stage application under 35 USC 371 of International Application No. PCT/GB2017/053529, filed Nov. 23, 2017, which claims the priority of United Kingdom Application No. 1619969.7, filed Nov. 25, 2016, the entire contents of each of which are incorporated herein by reference.

FIELD OF THE INVENTION

The present invention relates to a battery system, particularly one suited for use in an electric vehicle.

BACKGROUND OF THE INVENTION

The combined charging system or CCS is an open standard that relates to the charging of electric vehicles. The current standard, CCS 2.0, provides for charging at voltages up to 500 V. However, the future standard, CCS 3.0, proposes charging at voltages up to 1000 V. In order that future vehicles supporting CCS 3.0 can use existing CCS 2.0 chargers, a battery system is required that supports charging at both 500 V and 1000 V.

SUMMARY OF THE INVENTION

The present invention provides a battery system comprising positive and negative charge-discharge terminals, first and second batteries, first and second unidirectional switches, and a bridging switch, wherein: the first battery and the first unidirectional switch are connected in series across the charge-discharge terminals, the first unidirectional switch providing a conductive path from the positive charge-discharge terminal to a positive terminal of the first battery; the second battery and the second unidirectional switch are connected in series across the charge-discharge terminals, the second unidirectional switch providing a conductive path from the negative terminal of the second battery to the negative charge-discharge terminal; the batteries and the bridging switch are connected in series across the charge-discharge terminals, the bridging switch being located between the positive terminal of the first battery and the negative terminal of the second battery; and the switches are configurable between a first configuration in which the first and second unidirectional switches are closed and the bridging switch is open such that the batteries are connected in parallel across the charge-discharge terminals, and a second configuration in which the first and second unidirectional switches are open and the bridging switch is closed such that the batteries are connected in series across the charge-discharge terminals.

By setting the switches to either the first configuration or the second configuration, the battery system may be charged at two different voltages without exceeding the rated maximum voltage of the batteries. For example, when a charging voltage of 500 V is applied to the charge-discharge terminals, the switches may be set to the first configuration such that the batteries are connected in parallel across the charge-discharge terminals. When a charging voltage of 1000 V is applied to the charge-discharge terminals, the switches may be set to the second configuration such that the batteries are connected in series across the charge-discharge terminals. As a result, irrespective of whether a charging voltage of 500 V or 1000 V is applied to the charge-discharge terminals, the voltage across each battery is no more than 500 V.

It is conceivable that the two batteries may be at slightly different voltages prior to charging. Consequently, if the first and second switches were bidirectional, one battery would discharge into the other battery when connected in parallel, i.e. when the switches are in the first configuration. The resulting currents would then most likely damage the switches and/or other components of the battery system. Employing unidirectional switches ensures that neither battery is capable of discharging into the other battery.

The batteries may be discharged by connecting the batteries in series across the charge-discharge terminals, i.e. by setting the switches to the second configuration. When the switches are set to the second configuration, the batteries can be both charged and discharged without the need to change the state of any of the switches.

In addition to discharging the batteries when connected in series, it may be desirable to discharge the batteries when connected in parallel. Accordingly, the battery system may comprise a third unidirectional switch and a fourth unidirectional switch. The first battery and the third unidirectional switch are then connected in series across the charge-discharge terminals such that the third unidirectional switch provides a conductive path from the positive terminal of the first battery to the positive charge-discharge terminal. The second battery and the fourth unidirectional switch are also connected in series across the charge-discharge terminals such that the fourth unidirectional switch provides a conductive path from the negative charge-discharge terminal to the negative terminal of the second battery. The switches are then configurable between three configurations. In the first configuration, the first and second unidirectional switches are closed and the third and fourth unidirectional switches and the bridging switch are open. As a result, the batteries may be charged in parallel. In the second configuration, the bridging switch is closed and the first, second, third and fourth unidirectional switches are open. As a result, the batteries may be charged and/or discharged in series. Finally, in the third configuration, the third and fourth unidirectional switches are closed and the first and second unidirectional switches and the bridging switch are open. As a result, the batteries may be discharged in parallel. The battery system therefore provides for both charging and discharging of the batteries when connected in series or parallel.

It may be advantageous or indeed necessary, depending on the intended application, to have a battery system that permits both charging and discharging of the batteries without the need to change the state of the switches. With the battery system described in the preceding paragraph, it is possible to charge and discharge the batteries when the switches are in the second configuration, i.e. it is possible to charge and discharge the batteries when connected in series without changing the state of any of the switches. However, when the switches are in the first configuration, the battery system permits only charging of the batteries, and when the switches are in the third configuration, the battery system permits only discharging of the batteries. As a result, it is not possible to both charge and discharge the batteries when connected in parallel without changing the state of the switches. In order to address this, the battery system may comprise a bridging diode connected in series with the batteries across the charge-discharge terminals. The bridging diode is connected in parallel with the bridging switch and provides a conductive path from the negative terminal of the second battery to the positive terminal of the first battery. Consequently, when the switches are in the third configuration, the batteries may be discharged in parallel and the batteries may be charged in series.

Each unidirectional switch may comprise a contactor and a diode connected in series. A contactor has several advantages over a semiconductor switch. For example, a contactor is relatively simple to control, relatively easy to interlock, and generally more robust than a semiconductor switch.

However, contactors may be susceptible to mechanical shocks, for example resulting from impact, which may cause a contactor to inadvertently close. When the battery system of the present invention is utilised in an electric vehicle, such mechanical shocks may occur when the electric vehicle is being driven, for example when the batteries are connected in series across the charge-discharge terminals. Where each unidirectional switch comprises a contactor and a diode connected in series, inadvertent closing of the contactors when the batteries are connected in series has the potential to cause a short. To mitigate this risk, each unidirectional switch may comprise a controlled semiconductor switch, for example a thyristor. The thyristor may be energised when the batteries are connected in parallel across the charge-discharge terminals, such that current can flow only one way through the thyristor. The thyristor may be "turned-off" when the batteries are connected in series across the charge-discharge terminals, thereby removing any potential current path which may cause a short. The thyristor may be in addition to, or replace, either or both of the diode and the contactor. The bridging switch may comprise a controlled semiconductor switch, for example a thyristor, a MOSFET, or an IGBT. Alternatively, the bridging switch may comprise a contactor.

Each unidirectional switch may comprise a diode, a controlled semiconductor device, and a contactor connected in series, where the controlled semiconductor device comprises one of a thyristor, an IGBT, or a MOSFET. This may be beneficial as the semiconductor device may be "turned off" when the batteries are connected in series across the charge-discharge terminals, thereby removing any potential current path which may cause a short.

The opening and closing of the switches may be interlocked such that the bridging switch is opened whenever the first and second unidirectional switches are closed, and the first and second unidirectional switches are opened whenever the bridging switch is closed. This then avoids potentially unsafe states in which the bridging switch is closed together with one or both of the unidirectional switches. Although the switches may be interlocked, it is quite possible that, in the event of a fault, the bridging switch may be closed at the same time as one or both of the unidirectional switches. This would then cause one or both of the batteries to short. Accordingly, in order to reduce the number of potentially unsafe states, the bridging switch and either the first unidirectional switch or the second unidirectional switch may form a single-pole, double-throw switch. As a result, the bridging switch cannot be closed simultaneously with either the first or second unidirectional switch.

Potentially unsafe states may be avoided altogether by having a further bridging switch. The batteries, the bridging switch and the further bridging switch are then connected in series across the charge-discharge terminals, with the bridging switch and the further bridging switch being located between the positive terminal of the first battery and the negative terminal of the second battery. The first unidirectional switch together with the bridging switch then form a first single-pole, double-throw switch, and the second unidirectional switch together with the further bridging switch form a second single-pole, double-throw switch. As a result, it should not be possible to have a switch configuration that would short either battery.

The present invention also provides a battery system comprising positive and negative charge-discharge terminals, first and second batteries, first and second diodes, and first and second switches, wherein: each switch comprises a single-pole, double-throw contactor having a first terminal, a second terminal and a common terminal; the first battery, the first diode and the first switch are connected in series across the charge-discharge terminals, the first terminal of the first switch being connected to a cathode of the first diode and the common terminal of the first switch being connected to a positive terminal of the first battery; the second battery, the second diode and the second switch are connected in series across the charge-discharge terminals, the first terminal of the second switch being connected to an anode of the second diode and the common terminal of the second switch being connected to a negative terminal of the second battery; the second terminal of the first switch is connected to the second terminal of the second switch; and the switches are configurable between a first configuration in which the first terminal of each switch is closed such that the batteries are connected in parallel across the charge-discharge terminals, and a second configuration in which the second terminal of each switch is closed such that the batteries are connected in series across the charge-discharge terminals.

By setting the switches to either the first configuration or the second configuration, the battery system may be charged at two different voltages without exceeding the rated maximum voltage of the batteries. In particular, when charging at a lower voltage, the switches may be set to the first configuration such that the batteries are connected in parallel across the charge-discharge terminals. When charging at a higher voltage, the switches may be set to the second configuration such that the batteries are connected in series across the charge-discharge terminals.

The diodes ensure that, when the batteries are connected in parallel, neither battery is capable of discharging into the other battery.

The switches may be interlocked such that closing the first or second terminal of one switch causes the same terminal of the other switch to close. However, failure of one or both of the switches could conceivably lead to a situation in which the first terminal of one switch and the second terminal of the other switch are closed. By employing single-pole, double-throw switches, closing the first terminal of one switch and closing the second terminal of the other switch will simply lead to a situation in which one battery is connected across the charge-discharge terminals and the other battery is in open circuit. Consequently, in the event of a fault with one or both of the switches, there is no switch configuration that would cause one of the batteries to be shorted or one of the batteries to discharge into the other.

According to a further aspect of the present invention there is provided a battery system comprising positive and negative charge-discharge terminals, first and second batteries, a unidirectional switch, a switch-connected unidirectional circuit component, a selective connection component, and a bridging switch, wherein: the first battery and the unidirectional switch are connected in series across the charge-discharge terminals, the unidirectional switch providing a conductive path from the positive charge-discharge terminal to a positive terminal of the first battery; the second battery and the switch-connected unidirectional circuit component are connected in series across the charge-discharge terminals, the switch-connected unidirectional circuit component providing a conductive path from the positive charge-discharge terminal to a positive terminal of the second battery; the second battery and the selective connection component are connected in series across the charge-discharge terminals, the selective connection component providing a conductive path from a negative terminal of the second battery to the negative charge-discharge terminal; the batteries and the bridging switch are connected in series across the charge discharge terminals, the bridging switch being located between the positive terminal of the first battery and the negative terminal of the second battery; the switches are configurable between a first configuration in which the unidirectional switch and the selective connection component are closed, and the bridging switch and the switch of the switch-connected unidirectional circuit component are open, such that the batteries are connected in parallel across the charge-discharge terminals, and a second configuration in which the unidirectional switch, the selective connection component, and the switch of the switch-connected unidirectional circuit component are open, and the bridging switch is closed, such that the batteries are connected in series across the charge-discharge terminals.

By setting the switches to either the first configuration or the second configuration, the battery system may be charged at two different voltages without exceeding the rated maximum voltage of the batteries. For example, when a charging voltage of 500 V is applied to the charge-discharge terminals, the switches may be set to the first configuration such that the batteries are connected in parallel across the charge-discharge terminals. When a charging voltage of 1000 V is applied to the charge-discharge terminals, the switches may be set to the second configuration such that the batteries are connected in series across the charge-discharge terminals. As a result, irrespective of whether a charging voltage of 500 V or 1000 V is applied to the charge-discharge terminals, the voltage across each battery is no more than 500 V.

It is conceivable that the two batteries may be at slightly different voltages prior to charging. The unidirectional switch and the unidirectional circuit component act to prevent one battery from discharging into the other battery when connected in parallel, i.e. when the switches are in the first configuration. This prevents currents which would most likely damage the switches and/or other components of the battery system from flowing between the batteries when connected in parallel.

The switches may have a third configuration in which the unidirectional switch and the selective connection component are open, and the switch of the switch-connected unidirectional circuit component and the bridging switch are closed, such that the batteries are connected in series across the charge-discharge terminals. This may enable the first and second batteries to be discharged in series.

By a unidirectional circuit component is meant a circuit component which enables current flow in one direction only. The unidirectional circuit component may comprise an uncontrolled semiconductor device, for example a diode, or a controlled semiconductor device, for example a thyristor, a MOSFET, or an IGBT, which can be switched on and off within the circuit.

The selective connection component may comprise a circuit component which selectively provides a current path, for example such that a conductive path is selectively defined between the negative terminal of the second battery and the negative charge-discharge terminal. The selective connection component may comprise a switch, for example a contactor or a controlled semiconductor device such as a thyristor, or an uncontrolled semiconductor device such as a diode, or any combination of the aforementioned components.

Beneficial features of aspects of the present invention may be equally applicable to other aspects of the present invention, where appropriate.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1:
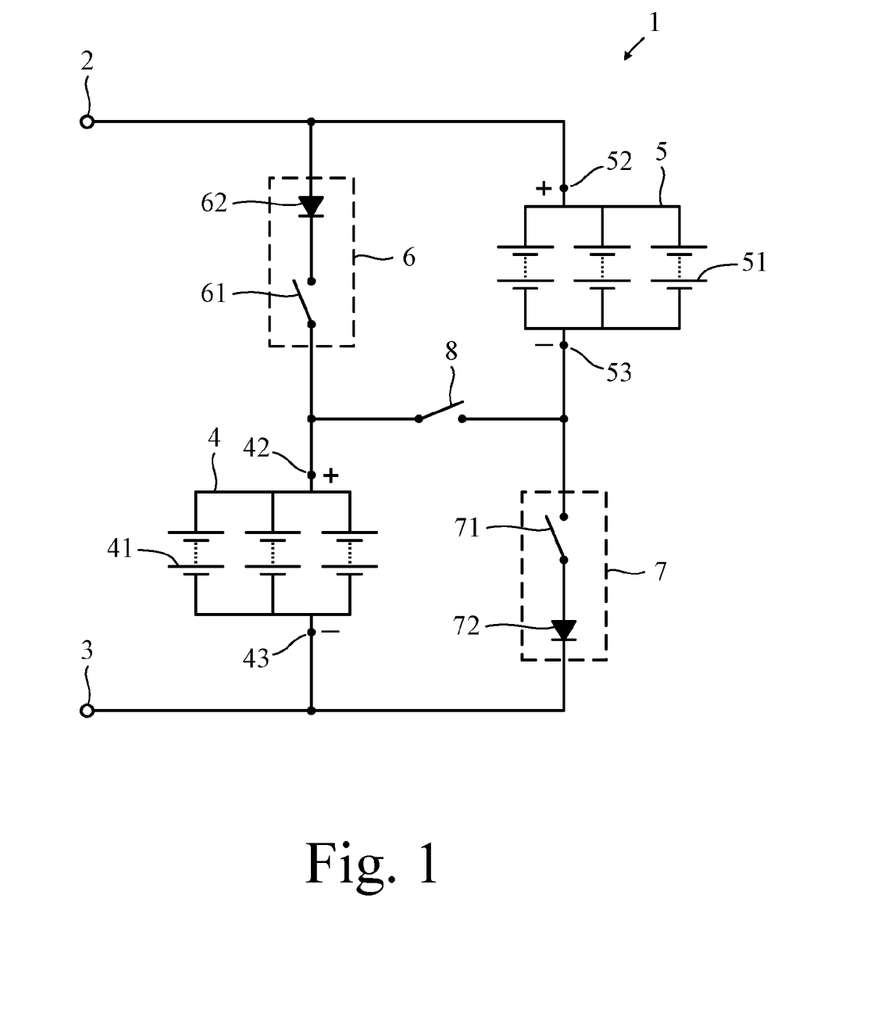
FIG. 1 is a circuit diagram of a first battery system in accordance with the present invention.

The battery system 1 of FIG. 1 comprises positive and negative charge-discharge terminals 2, 3, first and second batteries 4, 5, first and second unidirectional switches 6, 7, and a bridging switch 8.

Each battery 4, 5 comprises a plurality of cells 41, 51, a positive terminal 42, 52 and a negative terminal 43, 53. Each unidirectional switch 6, 7 comprises a bidirectional contactor 61, 71 and a diode 62, 72 connected in series. The bridging switch 8 comprises a bidirectional contactor.

The first battery 4 and the first unidirectional switch 6 are connected in series across the charge-discharge terminals 2, 3. The first unidirectional switch 6 then provides a conductive path from the positive charge-discharge terminal 2 to the positive terminal 42 of the first battery 4. The second battery 5 and the second unidirectional switch 7 are likewise connected in series across the charge-discharge terminals 2, 3. The second unidirectional switch 7 provides a conductive path from the negative terminal 53 of the second battery 5 to the negative charge-discharge terminal 3. The batteries 4, 5 and the bridging switch 8 are connected in series across the charge-discharge terminals 2, 3. More specifically, the bridging switch 8 is located between the positive terminal 42 of the first battery 4 and the negative terminal 53 of the second battery 5.

The switches 6, 7, 8 are configurable between a first configuration and a second configuration. In the first configuration, the first and second unidirectional switches 6, 7 are closed and the bridging switch 8 is open. As a result, the first battery 4 and the second battery 5 are connected in parallel across the charge-discharge terminals 2, 3. In the second configuration, the first and second unidirectional switches 6, 7 are open and the bridging switch 8 is closed.

As a result, the first battery 4 and the second battery 5 are connected in series across the charge-discharge terminals 2, 3.

The battery system 1 therefore has two configurations in which the batteries 4, 5 are connected in parallel (first configuration) or series (second configuration). In particular, when a first voltage is applied to the charge-discharge terminals 2, 3, the switches 6, 7, 8 may be set to the first configuration such that the batteries 4, 5 are charged in parallel. When a second, higher voltage is applied to the charge-discharge terminals 2, 3, the switches 6, 7, 8 may be set to the second configuration such that the batteries 4, 5 are charged in series. As a result, the battery system 1 may be charged at two different voltages without exceeding the rated maximum voltage of the batteries 4, 5. For example, the rated maximum voltage of each battery may be 410 V. The battery system 1 may then be charged at 400 V or 800 V. When the charge voltage is 400 V, the switches 6, 7, 8 are set to the first configuration and the batteries 4, 5 are connected in parallel. As a result, the voltage across each battery 4, 5 is 400 V. When the charge voltage is 800 V, the switches 6, 7, 8 are set to the second configuration and the batteries 4, 5 are connected in series. As a result, the voltage across each battery 4, 5 is again 400 V. Consequently, irrespective of whether the charge voltage is 400 V or 800 V, the voltage across each battery 4, 5 does not exceed the rated maximum voltage.

The ability to charge the battery system 1 at two different voltages is of particular importance when using different chargers, e.g. legacy or future chargers. In particular, when used in an electric vehicle, the battery system 1 may be charged using a CCS 2.0 compliant charger, which provides for charging at voltages up to 500 V, or a CCS 3.0 compliant charger, which provides for charging at voltages up to 1000 V.

It is quite conceivable that the two batteries 4, 5 may be at slightly different voltages prior to charging. If the first and second switches 6, 7 were bidirectional, one of the batteries 4, 5 would discharge into the other of the batteries 4, 5 when connected in parallel, i.e. when the switches 6, 7, 8 are in the first configuration. The resulting currents would then most likely damage the switches 6, 7, 8 and/or other components of the battery system 1. By employing unidirectional switches, discharging of one battery into another battery is prevented.

The battery system 1 is discharged by connecting the batteries 4, 5 in series across the charge-discharge terminals 2, 3, i.e. by setting the switches 6, 7, 8 to the second configuration. When the switches 6, 7, 8 are set to the second configuration, the batteries 4, 5 can be both charged and discharged without the need to change the state of the switches 6, 7, 8. This may be advantageous or indeed required depending on the intended application.

In addition to discharging the batteries 4, 5 when connected in series, it may be desirable to discharge the batteries 4, 5 when connected in parallel. Unfortunately this is not possible with the battery system 1 of FIG. 1. It is, however, possible with the battery system 100 of FIG. 2.

Figure 2:
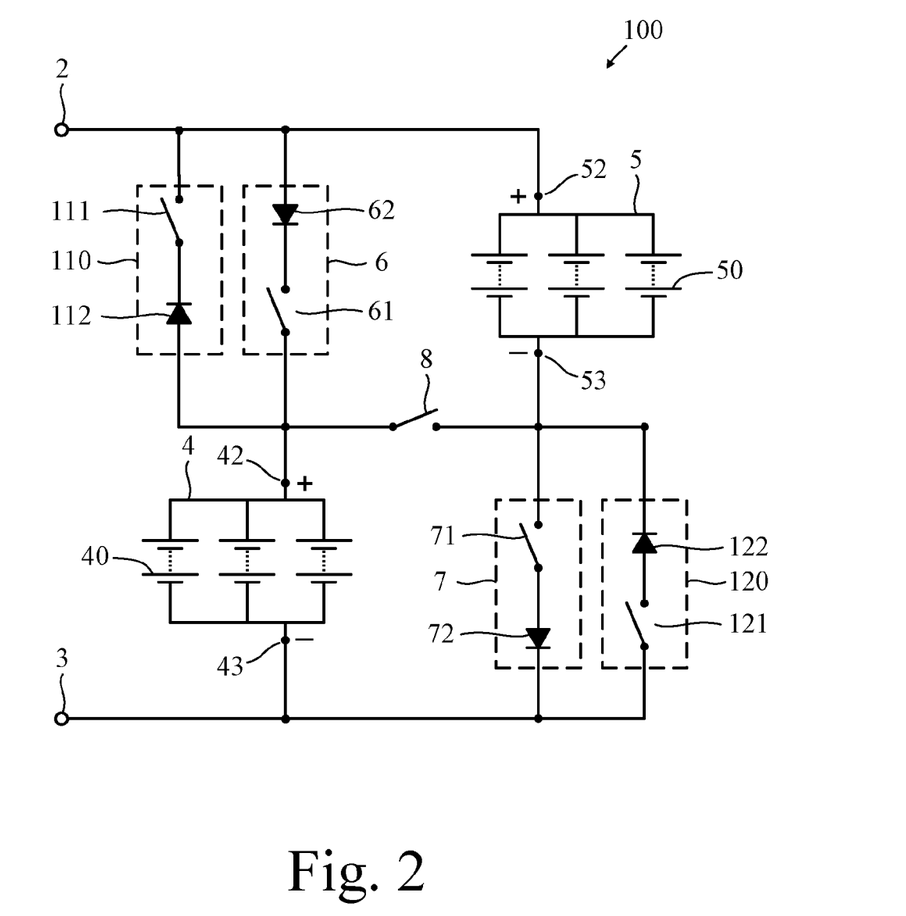
FIG. 2 is a circuit diagram of a second battery system in accordance with the present invention.

The battery system 100 of FIG. 2 is identical to that of FIG. 1 except for the addition of a third unidirectional switch 110 and a fourth unidirectional switch 120.

The third and fourth unidirectional switches 110, 120, like that of the first and second unidirectional switches 6, 7, comprise a bidirectional contactor 111, 121 and a diode 112, 122 connected in series.

The first battery 4 and the third unidirectional switch 110 are connected in series across the charge-discharge terminals 2, 3. The third unidirectional switch 110 is connected in parallel with the first unidirectional switch 6 and provides a conductive path from the positive terminal 42 of the first battery 4 to the positive charge-discharge terminal 2. The second battery 5 and the fourth unidirectional switch 120 are connected in series across the charge-discharge terminals 2, 3. The fourth unidirectional switch 120 is connected in parallel with the second unidirectional switch 7 and provides a conductive path from the negative charge-discharge terminal 3 to the negative terminal 53 of the second battery 5.

The switches 6, 7, 8, 110, 120 are configurable between a first configuration, a second configuration and a third configuration. In the first configuration, the first and second unidirectional switches 6, 7 are closed, and the third and fourth unidirectional switches 110, 120 and the bridging switch 8 are open. In the second configuration, the bridging switch 8 is closed, and the first, second, third and fourth unidirectional switches 6, 7, 110, 120 are open. In the third configuration, the third and fourth unidirectional switches 110, 120 are closed, and the first and second unidirectional switches 6, 7 and the bridging switch 8 are open.

The battery system 100 therefore has three configurations in which the batteries 4, 5 are connected in parallel for charging (first configuration), in series for both charging and discharging (second configuration), or in parallel for discharging (third configuration). The battery system 100 therefore provides for both charging and discharging of the batteries 4, 5 when connected in parallel or series. As a result, the battery system 100 may be charged at two different voltages, and the battery system 100 may be discharged at two different voltages.

As noted above, it may be advantageous or indeed necessary, depending on the intended application, to a have a battery system that permits both charging and discharging of the batteries without the need to change the state of the switches. When the switches 6, 7, 8, 110, 120 of the battery system 100 of FIG. 2 are in the second configuration, it is possible to both charge and discharge the batteries 4, 5 in series without the need to change the state of the switches. However, when the switches 6, 7, 8, 110, 120 are in the first configuration it is possible only to charge the batteries 4, 5, and when the switches 6, 7, 8, 110, 120 are in the third configuration it is possible only to discharge the batteries 4, 5. It is not therefore possible to both charge and discharge the batteries 4, 5 when connected in parallel without changing the state of the switches 6, 7, 8, 110, 120. The battery system 200 of FIG. 3, however, permits discharging of the batteries 4, 5 in parallel and charging of the batteries 4, 5 in series without changing the state of the switches 6, 7, 8, 110, 120.

Figure 3:
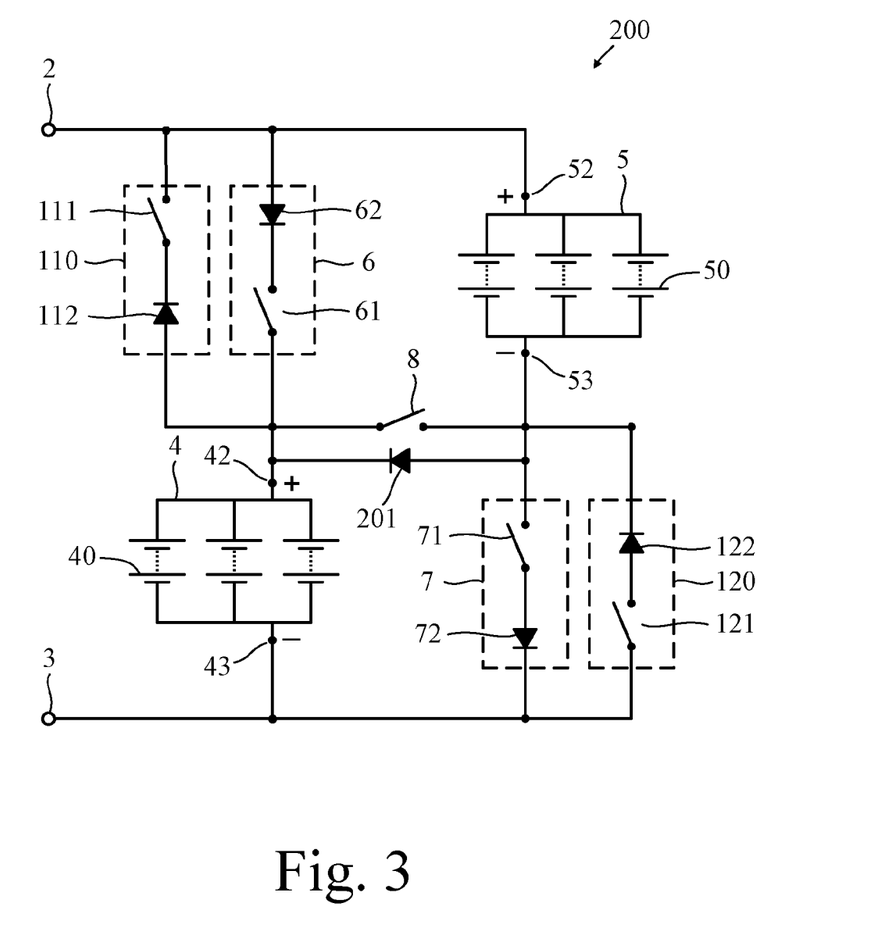
FIG. 3 is a circuit diagram of a third battery system in accordance with the present invention.

The battery system 200 of FIG. 3 is identical to that of FIG. 2 except for the addition of a bridging diode 201.

The bridging diode 201 is connected in series with the batteries 4, 5 across the charge-discharge terminals 2, 3. The bridging diode 201 is connected in parallel with the bridging switch 8 and provides a conductive path from the negative terminal 53 of the second battery 5 to the positive terminal 42 of the first battery 4.

The battery system 200 continues to have the same three configurations as the battery system 100 of FIG. 2. However, owing to the conductive path provided by the bridging diode 201, it is now possible to charge the batteries 4, 5 in series when the switches 6, 7, 8, 110, 120 are in the third configuration. As a result, the battery system 200 has three configurations in which the batteries 4, 5 may be charged in parallel (first configuration), the batteries 4, 5 may be charged and discharged in series (second configuration), and the batteries 4, 5 may be charged in series and discharged in parallel (third configuration).

In each of the battery systems 1, 100, 200 described above, the opening and closing of the switches may be interlocked so as to avoid potentially unsafe states. In particular, the first and second unidirectional switches 6, 7 and the bridging switch 8 may be interlocked such that the unidirectional switches 6, 7 are opened whenever the bridging switch 8 is closed, and the bridging switch 8 is opened whenever the unidirectional switches 6, 7 are closed. This then avoids potentially unsafe states in which the bridging switch 8 is closed together with one or both of the unidirectional switches 6, 7, which would otherwise cause one or both of the batteries 4, 5 to short. Although the switches 6, 7, 8 are ideally interlocked, it is quite possible that, in the event of a fault, one or both of the first and second unidirectional switches 6, 7 may be closed at the same time as the bridging switch 8. Accordingly, in order to reduce the number of potentially unsafe states, the contactor of the bridging switch 8 together with the contactor 61, 71 of either the first or second unidirectional switch 6, 7 may form a single-pole double-throw contactor. As a result, the bridging switch 8 cannot be closed simultaneously with either the first or second unidirectional switch 6, 7. Moreover, shorting of the batteries 4, 5 may be avoided altogether by employing two single-pole, double-throw contactors, as will now be described with reference to FIG. 4.

Figure 4:
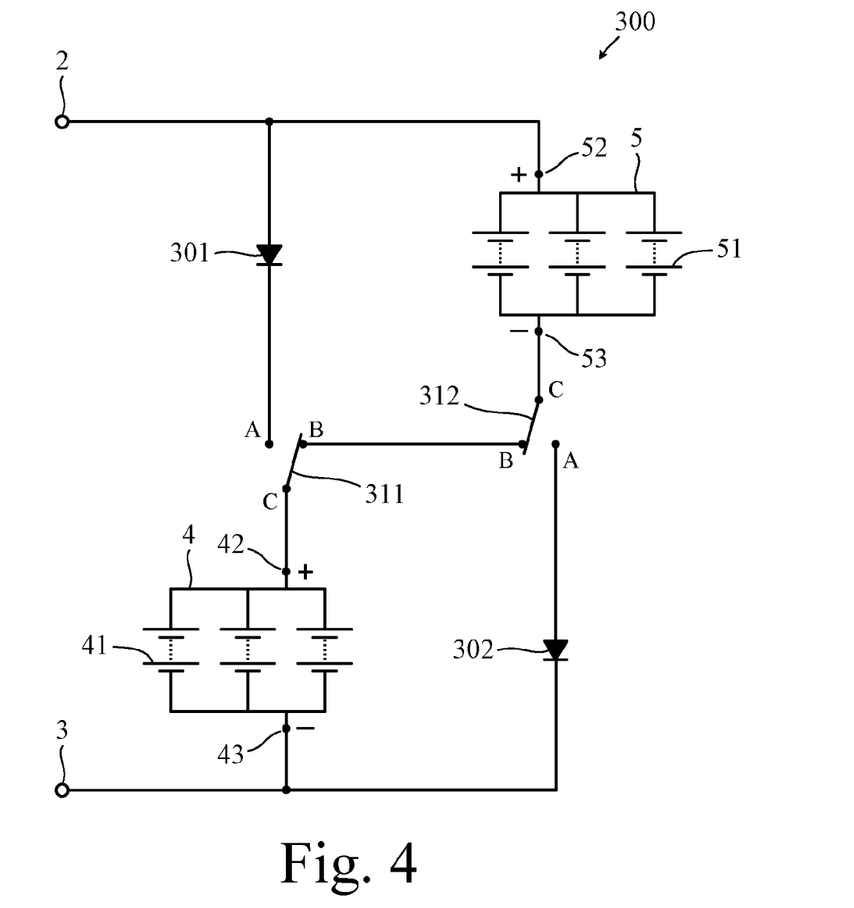
FIG. 4 is a circuit diagram of a fourth battery system in accordance with the present invention.

The battery system 300 of FIG. 4 comprises positive and negative charge-discharge terminals 2, 3, first and second batteries 4, 5, first and second diodes 301, 302, and first and second switches 311, 312.

The charge-discharge terminals 2, 3 and the batteries 4, 5 are unchanged from the battery systems 1, 100, 200 of FIGS. 1 to 3.

Each of the switches 311, 312 comprises a single-pole, double-throw contactor having three terminals: a first terminal A and a second terminal B that vie for connection to a third, common terminal C.

The first battery 4, the first diode 301 and the first switch 311 are connected in series across the charge-discharge terminals 2, 3. More specifically, the first terminal A of the first switch 311 is connected to the cathode of the first diode 301 and the common terminal C of the first switch 311 is connected to the positive terminal 42 of the first battery 4. Consequently, when the first terminal A of the first switch 311 is closed, a conductive path is provided from the positive charge-discharge terminal 2 to the positive terminal 42 of the first battery 4. The second battery 5, the second diode 302 and the second switch 312 are likewise connected in series across the charge-discharge terminals 2, 3. More specifically, the first terminal A of the second switch 312 is connected to the anode of the second diode 302 and the common terminal C of the second switch 312 is connected to the negative terminal 53 of the second battery 5. Consequently, when the first terminal A of the second switch 312 is closed, a conductive path is provided from the negative terminal 53 of the second battery 5 to the negative charge-discharge terminal 3. The second terminal B of the first switch 311 is then connected to the second terminal B of the second switch 312.

The switches 311, 312 are configurable between a first configuration and a second configuration. In the first configuration, the first terminal A of each switch 311, 312 is closed. As a result, the first battery 4 and the second battery 5 are connected in parallel across the charge-discharge terminals 2, 3. In the second configuration, the second terminal B of each switch 311, 312 is closed. As a result, the first battery 4 and the second battery 5 are connected in series across the charge-discharge terminals 2, 3.

The battery system 300 therefore has two configurations in which the batteries 4, 5 are connected in parallel (first configuration) or series (second configuration). The batteries 4, 5 may then be charged in parallel (first configuration), or charged and discharged in series (second configuration).

Figure 5:
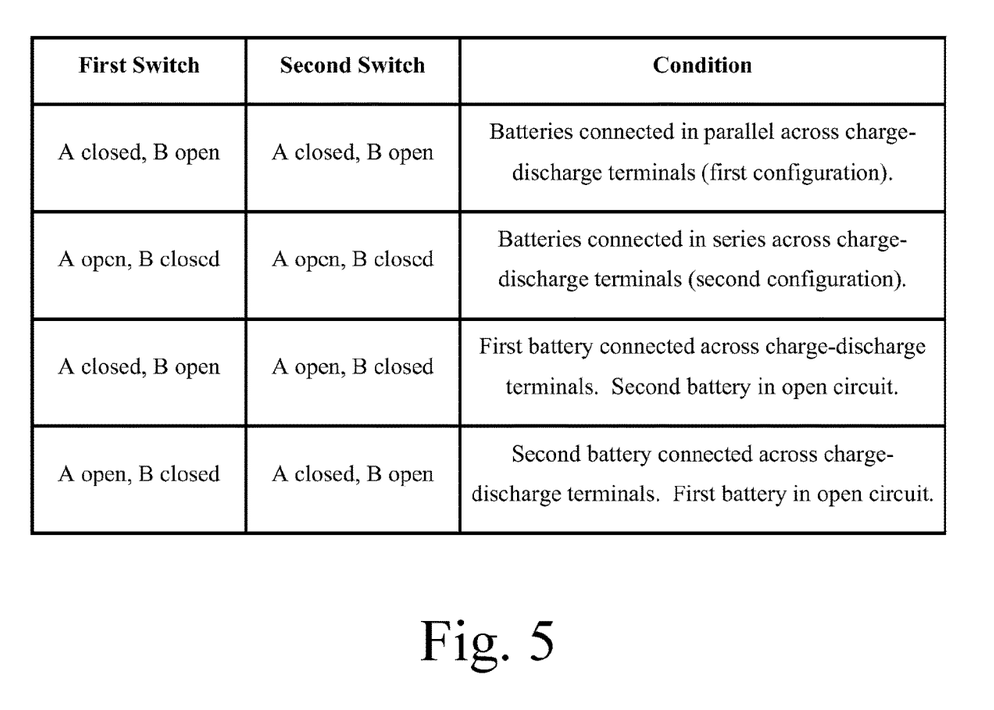
FIG. 5 is a table of the possible states of the two switches of FIG. 4.

Although the switches 311, 312 are intended to adopt just one of two configurations, there are in fact four possible configurations that the switches 311, 312 could adopt. The four configurations are detailed in FIG. 5. The switches 311, 312 may be interlocked such that closing the first or second terminal of one switch causes the same terminal of the other switch to close. As a result, the switches 311, 312 are constrained to adopt just the first configuration or the second configuration. However, failure of one or both of the switches 311, 312 could conceivably lead to a situation in which the first terminal A of one switch is closed and the second terminal B of the other switch is closed. Nevertheless, as is evident from FIGS. 4 and 5, closing the first terminal A of one switch and closing the second terminal B of the other switch leads to a situation in which one battery 4, 5 is connected across the charge-discharge terminals 2, 3 and the other battery 4, 5 is in open circuit. Consequently, even in the event of a fault with one or both of the switches 311, 312, there are no unsafe states that might damage the batteries 4, 5. In particular, there are no states in which one of the batteries 4, 5 is shorted or one of the batteries 4, 5 discharges into the other.

It will be apparent that the battery system 300 of FIG. 4 is very similar to that of FIG. 1. Indeed, in drawing parallels with the battery system 1 of FIG. 1, the battery system 300 of FIG. 4 may be said to have a first unidirectional switch, a second unidirectional switch, a first bridging switch and a second bridging switch. The first unidirectional switch then comprises the first diode 301 along with the first and common terminals A, C of the first switch 311, and the second unidirectional switch comprises the second diode 302 along with the first and common terminals A, C of the second switch 312. The first bridging switch comprises the second and common terminals B, C of the first switch 311 and the second bridging switch comprises the second and common terminals B, C of the second switch 312.

Accordingly each battery system 1, 100, 200, 300 described above may be said to have a first unidirectional switch, a second unidirectional switch and at least one bridging switch. The first battery 4 and the first unidirectional switch are then connected in series across the charge-discharge terminals 2, 3, with the first switch providing a conductive path from the positive charge-discharge terminal 2 to a positive terminal 42 of the first battery 4. The second battery 5 and the second unidirectional switch are likewise connected in series across the charge-discharge terminals 2, 3, with the second switch providing a conductive path from the negative terminal 53 of the second battery 5 to the negative charge-discharge terminal 3. Finally, the batteries 4, 5 and the bridging switch are connected in series across the charge-discharge terminals 2, 3, with the bridging switch being located between the positive terminal 42 of the first battery 4 and the negative terminal 53 of the second battery 5. The switches are then configurable between at least a first configuration and a second configuration. In the first configuration, the first and second unidirectional switches are closed and the bridging switch is open such that the batteries 4, 5 are connected in parallel across the charge-discharge terminals 2, 3. In the second configuration, the first and second unidirectional switches are open and the bridging switch is closed such that the batteries 4, 5 are connected in series across the charge-discharge terminals 2, 3.

Like the battery system 1 of FIG. 1, it is not possible to discharge the battery system 300 of FIG. 4 with the batteries 4, 5 connected in parallel. However, as with the battery system 1 of FIG. 1, discharging in parallel may be achieved by the inclusion of the third and fourth unidirectional switches 110, 120 of the battery system 100 of FIG. 2 and, if desired, the bridging diode 201 of FIG. 3.

In each of the battery systems 1, 100, 200, 300 described above, the unidirectional switches 6, 7, 110, 120 each comprise a bidirectional contactor 61, 71, 111, 121 and a diode 62, 72, 112, 122 connected in series. Conceivably, one or more of the unidirectional switches 6, 7, 110, 120 may comprise an alternative type of bidirectional switch connected in series with a diode. Moreover, one or more of the unidirectional switches 6, 7, 110, 120 may comprise a semiconductor switch that conducts in one direction only, thus avoiding the need for a diode. Accordingly, in a more general sense, each unidirectional switch 6, 7, 110, 120 may be said to comprise one or more electrical components that collectively conduct in one direction only when closed.

Although each switch 6, 7, 110, 120, including the bridging switch 8, may comprise a semiconductor switch, there are significant advantages in using a contactor. For example, a contactor is relatively simple to control. A contactor is also relatively easy to interlock. For example, many contactors have an auxiliary contact that is used to monitor the position of the power contact. The output of the auxiliary contact of one contactor can then be used to control the position of the power contact of one or more other contactors. Furthermore, in comparison to semiconductor switches, contactors are more robust and thus are less likely to fail. Contactors are, however, relatively slow at switching between states. A semiconductor switch may therefore be advantageous when higher switching frequencies are required. For example, the bridging switch 8 may comprise a semiconductor switch that is pulsed at start up to limit inrush current.

Figure 6:
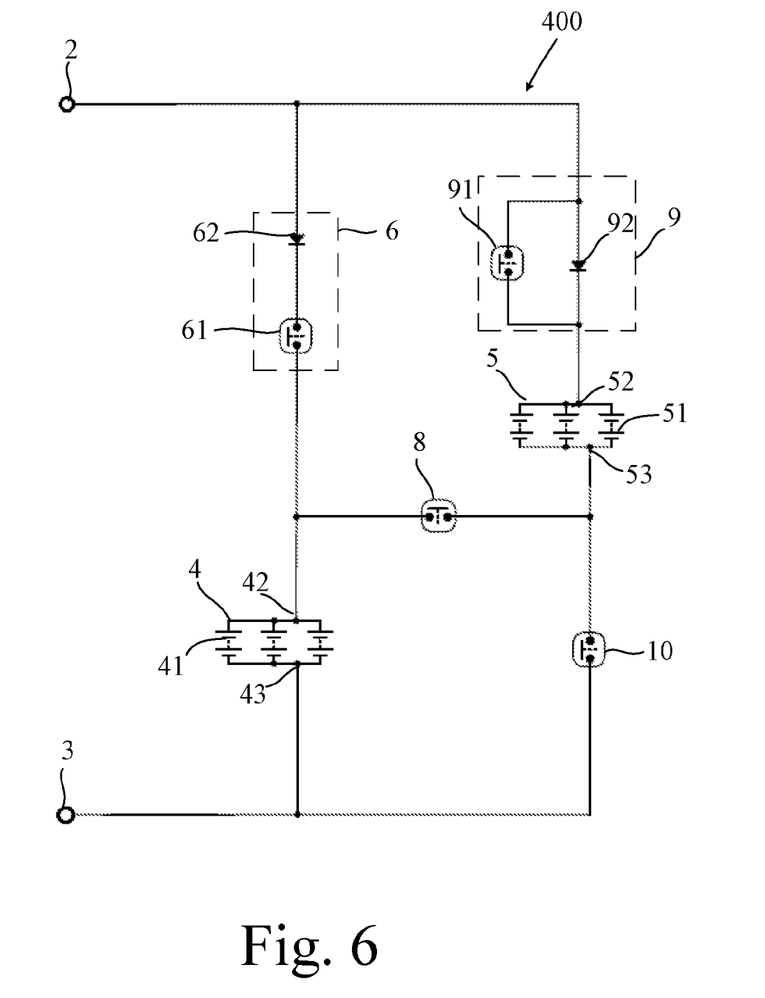
FIG. 6 is a circuit diagram of a fifth battery system in accordance with the present invention.

A battery system according to a further aspect of the present invention is shown in FIG. 6. The principal of reconfiguring the batteries between parallel and series configurations to allow for charging at two different voltages without exceeding the rated maximum voltage is also utilised in the battery system of FIG. 6, but is implemented in a slightly different manner.

The battery system 400 comprises positive and negative charge-discharge terminals 2, 3, first and second batteries 4, 5, a unidirectional switch 6, a switch-connected diode 9, a bidirectional switch 10, and a bridging switch 8.

Each battery 4, 5 comprises a plurality of cells 41, 51, a positive terminal 42, 52, and a negative terminal 43, 53. The unidirectional switch comprises a bidirectional contactor 61 and a diode 62 connected in series. The switch-connected diode 9 comprises a bidirectional contactor 91 and a diode 92 connected in parallel. The bidirectional switch 10 and the bridging switch 8 each comprise a bidirectional contactor.

The first battery 4 and the unidirectional switch 6 are connected in series across the charge-discharge terminals 2, 3. The unidirectional switch 6 then provides a conductive path from the positive charge-discharge terminal 2 to the positive terminal 42 of the first battery 4. The switch-connected diode 9 and the second battery 5 are connected in series across the charge-discharge terminals 2, 3. The switch-connected diode 9 provides a conductive path from the positive charge-discharge terminal 2 to the positive terminal 52 of the second battery 5. The second battery 5 and the bidirectional switch 10 are connected in series across the charge-discharge terminals 2, 3. The bidirectional switch 10 provides a conductive path from the negative terminal 53 of the second battery 5 to the negative charge-discharge terminal 3. The batteries 4, 5 and the bridging switch 8 are connected in series across the charge-discharge terminals 2, 3. More specifically, the bridging switch 8 is located between the positive terminal 42 of the first battery 4 and the negative terminal 53 of the second battery 5.

The switches 6, 8, 9, 10 are configurable between a first configuration, a second configuration, and a third configuration.

In the first configuration, the unidirectional switch 6 and the bidirectional switch 10 are closed, and the bridging switch 8 and the bidirectional contactor 91 of the switch-connected diode 9 are open. As a result, the first battery 4 and the second battery 5 are connected in parallel across the charge-discharge terminals 2, 3.

In the second configuration, the unidirectional switch 6, the bidirectional switch 10, and the bidirectional contactor 91 of the switch-connected diode 9 are open, and the bridging switch 8 is closed. As a result, the first battery 4 and the second battery 5 are connected in series across the charge-discharge terminals 2, 3.

In the third configuration, the unidirectional switch 6 and the bidirectional switch 10 are open, and the bidirectional contactor 91 of the switch-connected diode 9 and the bridging switch 8 are closed. As a result, the first battery 4 and the second battery 5 are connected in series across the charge-discharge terminals 2, 3.

The battery system 400 therefore has three configurations in which the batteries 4, 5 are connected in parallel (first configuration) or series (second and third configurations).

The first and second configurations allow the battery system 400 be charged at two different voltages without exceeding the rated maximum voltage of the batteries 4, 5. In particular, when a first voltage is applied to the charge-discharge terminals 2, 3, the switches 6, 8, 9, 10 may be set to the first configuration such that the batteries 4, 5 are charged in parallel. When a second, higher voltage is applied to the charge-discharge terminals 2, 3, the switches 6, 8, 9, 10 may be set to the second configuration such that the batteries 4, 5 are charged in series. As a result, the battery system 400 may be charged at two different voltages without exceeding the rated maximum voltage of the batteries 4, 5. For example, the rated maximum voltage of each battery may be 410 V. The battery system 400 may then be charged at 400 V or 800 V. When the charge voltage is 400 V, the switches 6,8,9,10 are set to the first configuration and the batteries 4, 5 are connected in parallel. As a result, the voltage across each battery 4, 5 is 400 V. When the charge voltage is 800 V, the switches 6, 8, 9, 10 are set to the second configuration and the batteries 4, 5 are connected in series. As a result, the voltage across each battery 4, 5 is again 400 V. Consequently, irrespective of whether the charge voltage is 400 V or 800 V, the voltage across each battery 4, 5 does not exceed the rated maximum voltage.

It is quite conceivable that the two batteries 4, 5 may be at slightly different voltages prior to charging. The diode 62 of the unidirectional switch 6 and the diode 92 of the switch-connected diode 9 prevent one of the batteries 4, 5 from discharging into the other of the batteries 4, 5 when connected in parallel, i.e. when the switches 6, 8, 9, 10 are in the first configuration.

The battery system 400 is discharged by connecting the batteries 4, 5 in series across the charge-discharge terminals 2, 3, i.e. by setting the switches 6, 8, 9, 10 to the third configuration. The bidirectional switch 91 of the switch-connected diode 9 acts to bypass the diode 92 of the switch-connected diode 9 in the third configuration, thereby allowing discharging of the batteries 4, 5 when connected in series. Although the battery system 400 requires a further switching state to the battery system 1 of FIG. 1, charging at both 400V and 800V may still be achieved, and discharge of one battery into the other battery when the batteries are connected in parallel and are at slightly different voltages may be avoided.

Figure 7:
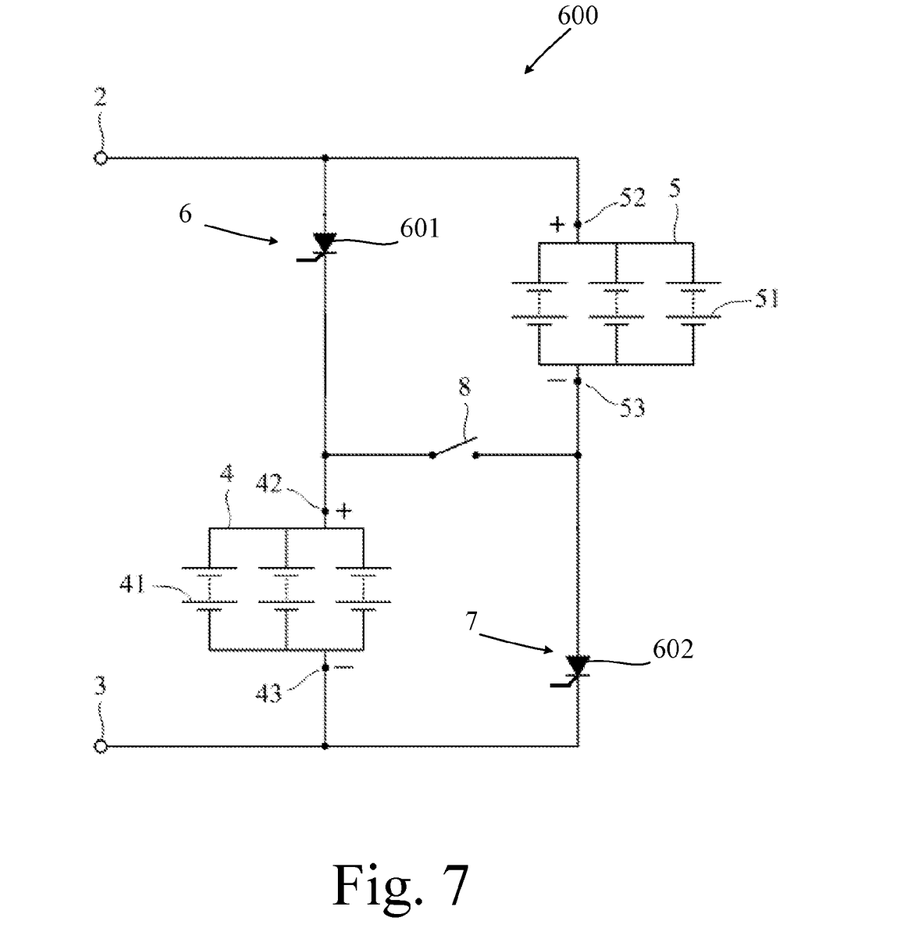
FIG. 7 is a circuit diagram of a sixth battery system in accordance with the present invention.

An alternative battery system 600 according to the present invention is shown in FIG. 7. The battery system 600 is generally the same as the battery system 1 of FIG. 1, in that the battery system 600 provides similar functionality, but differs in that the first 6 and second 7 unidirectional switches comprise thyristors 601, 602 instead of bidirectional contactors 61, 71 and diodes 62, 72 connected in series. The battery system 600 functions in a similar manner to the battery system 1, in that the thyristors 601, 602 can be turned on when the bridging switch 8 is off, such that the batteries 4, 5 are connected in parallel across the charge/discharge terminals 2, 3. In such a parallel configuration, the thyristors 601, 602 function in a similar manner to diodes to prevent current from flowing between the batteries 4, 5 where one of the batteries 4, 5 is at a different voltage to the other battery.

The thyristors 601, 602 can be turned off when the bridging switch 8 is on, such that the batteries 4, 5 are connected in series across the charge/discharge terminals 2, 3. In such a series configuration the thyristors 601, 602 are immune to mechanical shocks, and hence inadvertent closing of the thyristors 601, 602 when the battery system 600 is used in an electric vehicle being driven is prevented, and potential shorts are avoided.

Whilst not depicted in the figures, it is also envisaged that the bridging switch 8 may be changed from a contactor to a controlled semiconductor switch, for example a thyristor, a MOSFET, or an IGBT.

Figure 8:
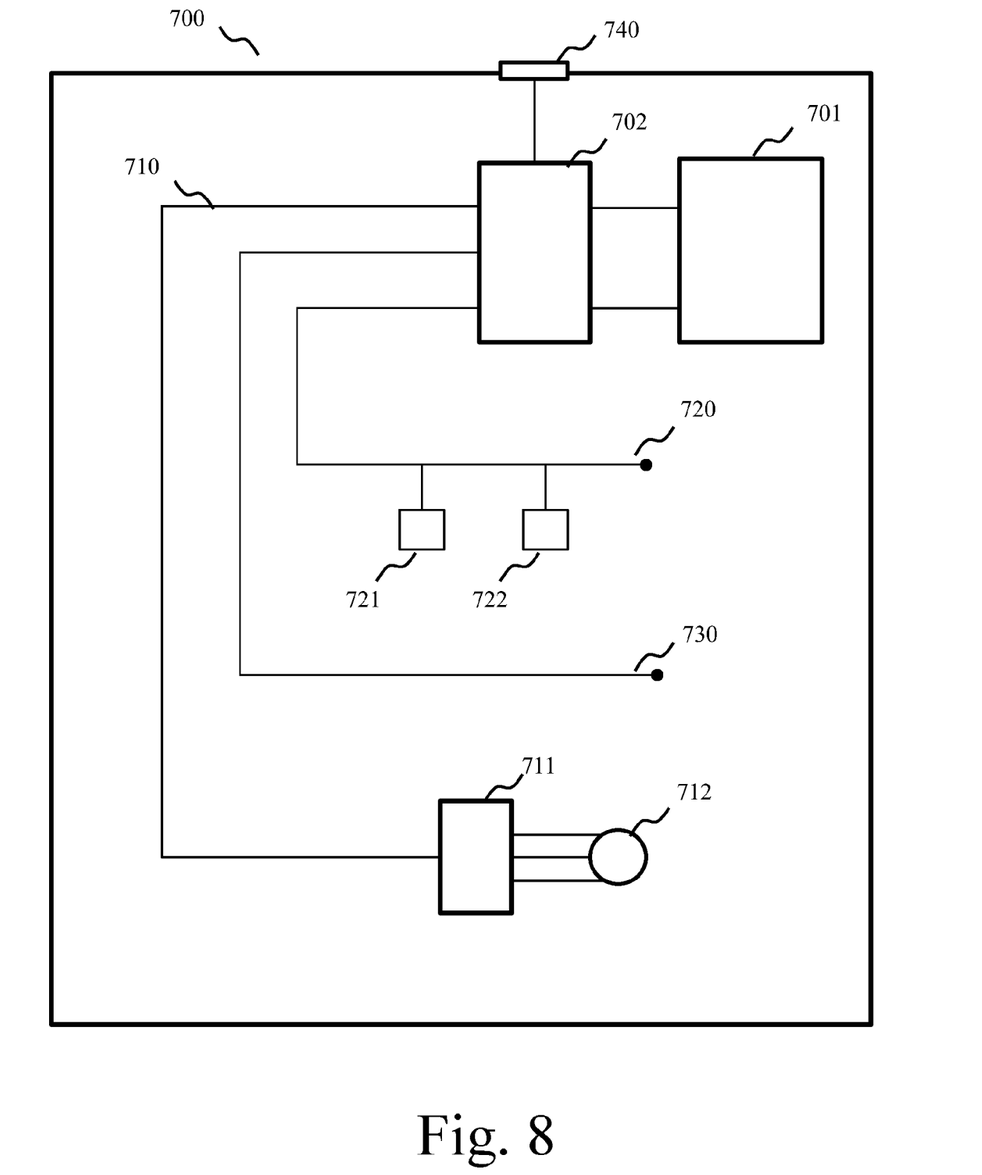
FIG. 8 is a schematic diagram indicating main components of an electrical system of an electric motor vehicle suitable for including a battery system in accordance with the present invention.

FIG. 8 is a schematic diagram indicating main components of an electrical system of an exemplary electric vehicle 700. This electrical system includes a battery system 701, which may be a battery system in accordance with the present invention as described above.

In the case shown in FIG. 8, electric vehicle 700 is a fully electric vehicle such as a battery electric vehicle (BEV). In other embodiments, electric vehicle 700 may be a fuel-cell vehicle (FCV) or a conventional internal combustion engine hybrid vehicle, in either case such that the vehicle comprises one or more electric motors which are in at least some configurations battery driven to provide motive force to the vehicle.

Battery system 701 connects via configuration circuitry 702 to one or more high voltage buses for the electric vehicle. This configuration circuitry 702 may be adapted to allow buses to be selectively powered depending on a current vehicle state, and may also provide isolation of particular systems in an appropriate vehicle state. The buses shown here include a primary bus 710 used to drive traction inverters 711 for operating electric motors 712 and a lower power bus 720 used to drive systems such as HVAC compressors 721 and heaters 722. The primary bus 710 may be designed to operate at a voltage up to 1000V (higher HV) and the lower power bus 720 at a voltage up to 500V (lower HV). An auxiliary bus 730 is shown that may operate at higher or lower HV depending on the configuration of the battery system 701, for systems that may be operated at a higher or lower power mode. An external charging connection 740 is also shown that may operate at higher or lower HV—this may also be provided through an appropriately configured bus. This arrangement of buses is exemplary only—other electric vehicle electrical system architectures may be employed also using battery systems in accordance with the invention.

In a charging configuration using the external charging connection 740, the battery system 701 will typically be disconnected from electric motors 712 and may, using appropriate embodiments of a battery system in accordance with the present invention, be charged at lower HV, higher HV, or in a charging strategy that involves charging at lower and higher HV at different times. In the arrangement shown, the battery system 701 may also be adapted to power at least one bus—such as auxiliary bus 730—at either higher or lower HV. In other specific electric vehicle embodiments, the battery system 701 may be reconfigured only in specific circumstances—for example, only for charging.

The invention claimed is:

1. A battery system comprising positive and negative charge-discharge terminals, first and second batteries, first and second unidirectional switches, and a bridging switch, wherein:

the first battery and the first unidirectional switch are connected in series across the charge-discharge terminals, the first unidirectional switch providing an unidirectional conductive path from the positive charge-discharge terminal to a positive terminal of the first battery;

the second battery and the second unidirectional switch are connected in series across the charge-discharge terminals, the second unidirectional switch providing an unidirectional conductive path from a negative terminal of the second battery to the negative charge-discharge terminal;

the batteries and the bridging switch are connected in series across the charge-discharge terminals, the bridging switch being located between the positive terminal of the first battery and the negative terminal of the second battery; and the switches are configurable between a first configuration in which the first and second unidirectional switches are closed and the bridging switch is open such that the batteries are connected in parallel across the charge-discharge terminals for charging, and a second configuration in which the first and second unidirectional switches are open and the bridging switch is closed such that the batteries are connected in series across the charge-discharge terminals for charging and discharging.

2. The battery system of claim 1, wherein the battery system comprises a third unidirectional switch and a fourth unidirectional switch, and wherein:

the first battery and the third unidirectional switch are connected in series across the charge-discharge terminals, the third unidirectional switch providing a conductive path from the positive terminal of the first battery to the positive charge-discharge terminal;

the second battery and the fourth unidirectional switch are connected in series across the charge-discharge terminals, the fourth unidirectional switch providing a conductive path from the negative charge-discharge terminal to the negative terminal of the second battery;

the switches are configurable between the first configuration, the second configuration and a third configuration;

the first and second unidirectional switches are closed and the third and fourth unidirectional switches and the bridging switch are open when in the first configuration such that the batteries are connected in parallel across the charge-discharge terminals for charging;

the bridging switch is closed and the first, second, third and fourth unidirectional switches are open when in the second configuration such that the batteries are connected in series across the charge-discharge terminals for charging and discharging; and the third and fourth unidirectional switches are closed and the first and second unidirectional switches and the bridging switch are open when in the third configuration such that the batteries are connected in parallel across the charge-discharge terminals for discharging.

3. The battery system of claim 1, wherein the battery system further comprises a bridging diode, the batteries and the bridging diode are connected in series across the charge-discharge terminals, the bridging diode is connected in parallel with the bridging switch, and the bridging diode provides a conductive path from the negative terminal of the second battery to the positive terminal of the first battery.

4. The battery system of claim 1, wherein at least one of the unidirectional switches comprises a contactor and a diode connected in series, or a thyristor, or a thyristor and a contactor connected in series, or a thyristor and a diode connected in series, or a thyristor and a contactor and a diode connected in series.

5. The battery system of claim 1, wherein the first or second unidirectional switch comprises a contactor and a diode connected in series, the bridging switch comprises a contactor, and the contactor of the first or second unidirectional switch and the contactor of the bridging switch form a single-pole, double-throw contactor.

6. The battery system of claim 1, wherein:

the battery system comprises a further bridging switch;

the batteries, the bridging switch and the further bridging switch are connected in series across the charge-discharge terminals, the bridging switch and the further bridging switch being located between the positive terminal of the first battery and the negative terminal of the second battery;

the first and second unidirectional switches each comprise a contactor and a diode connected in series;

the bridging switch and the further bridging switch each comprise a contactor;

the contactor of the first unidirectional switch and the contactor of the bridging switch form a first single-pole, double-throw contactor; and the contactor of the second unidirectional switch and the contactor of the further bridging switch form a second single-pole, double-throw contactor.

7. A battery system comprising positive and negative charge-discharge terminals, first and second batteries, first and second diodes, and first and second switches, wherein:

each switch of the first and second switches comprises a single-pole, double-throw contactor having a first terminal, a second terminal and a common terminal;

the first battery, the first diode and the first switch are connected in series across the charge-discharge terminals, the first terminal of the first switch being connected to a cathode of the first diode and the common terminal of the first switch being connected to a positive terminal of the first battery;

the second battery, the second diode and the second switch are connected in series across the charge-discharge terminals, the first terminal of the second switch being connected to an anode of the second diode and the common terminal of the second switch being connected to a negative terminal of the second battery;

the second terminal of the first switch is connected to the second terminal of the second switch; and the switches are configurable between a first configuration in which the first terminal of each switch is closed such that the batteries are connected in parallel across the charge-discharge terminals, and a second configuration in which the second terminal of each switch is closed such that the batteries are connected in series across the charge-discharge terminals.

8. A battery system comprising positive and negative charge-discharge terminals, first and second batteries, a unidirectional switch, a switch-connected unidirectional circuit component, a selective connection component, and a bridging switch, wherein:

the switch-connected unidirectional circuit component includes a bidirectional switch and a diode connected in parallel;

the first battery and the unidirectional switch are connected in series across the charge-discharge terminals, the unidirectional switch providing an unidirectional conductive path from the positive charge-discharge terminal to a positive terminal of the first battery;

the second battery and the switch-connected unidirectional circuit component are connected in series across the charge-discharge terminals, the switch-connected unidirectional circuit component providing a conductive path from the positive charge-discharge terminal to a positive terminal of the second battery;

the second battery and the selective connection component are connected in series across the charge-discharge terminals, the selective connection component providing a bidirectional conductive path from a negative terminal of the second battery to the negative charge-discharge terminal;

the batteries and the bridging switch are connected in series across the charge discharge terminals, the bridging switch being located and forming a directional conductive path between the positive terminal of the first battery and the negative terminal of the second battery;

the switches are configurable between a first configuration in which the unidirectional switch and the selective connection component are closed, and the bridging switch and the bidirectional switch of the switch-connected unidirectional circuit component are open, such that the batteries are connected in parallel across the charge-discharge terminals for charging at a first voltage, and a second configuration in which the unidirectional switch, the selective connection component, and the bidirectional switch of the switch-connected unidirectional circuit component are open, and the bridging switch is closed, such that the batteries are connected in series across the charge-discharge terminals for charging at a second voltage higher than the first voltage.

9. The battery system of claim 8, wherein the switches have a third configuration in which the unidirectional switch and the selective connection component are open, and the bidirectional switch of the switch-connected unidirectional circuit component and the bridging switch are closed, such that the batteries are connected in series across the charge-discharge terminals for discharging.

* * * * *